May 2, 1950   J. J. BUCKLEY   2,506,340
APPARATUS FOR CHARGING BATTERIES
Filed Feb. 23, 1949

Inventor:
Joseph J. Buckley,
by Claude A. Witt
His Attorney.

Patented May 2, 1950

2,506,340

UNITED STATES PATENT OFFICE 2,506,340

APPARATUS FOR CHARGING BATTERIES

Joseph J. Buckley, Melrose, Mass., assignor to General Electric Company, a corporation of New York Application February 23, 1949, Serial No. 77,747

10 Claims. (Cl. 320—23)

My invention relates to control apparatus and methods for charging electric storage batteries, and more particularly to apparatus and methods for charging a plurality of storage batteries from a single source of electric current supply.

It is a principal object of my invention to provide a new method and control apparatus for partially simultaneously charging a plurality of batteries from a single source of electric current supply.

It is a further object of my invention to provide a new and novel method and apparatus for partially simultaneously charging a plurality of electric storage batteries from a single source of electric current supply in a total elapsed time significantly less than that required to charge the batteries independently and sequentially.

In accordance with my invention, a plurality of batteries, for example two batteries, are so arranged for connection to a single source of electric current supply that one battery is separately charged at a high rate until its voltage attains a predetermined value corresponding to a condition of charge less than full charge, for example, 80% charge. When the first battery is thus partially charged, this battery is disconnected from the source and the other battery is connected to be separately charged at a high rate to a similar predetermined voltage value. When both batteries are thus partially charged, the batteries are connected simultaneously, for example, in parallel circuit relation, to the supply source, and a current limiting resistor is inserted between the supply source and the batteries, whereby the batteries are further charged simultaneously and at a reduced rate. A significant advantage of my foregoing arrangement is that the total elapsed charging time for both batteries is reduced very considerably over the time necessary for charging the batteries sequentially and completely independently.

Figure 1:
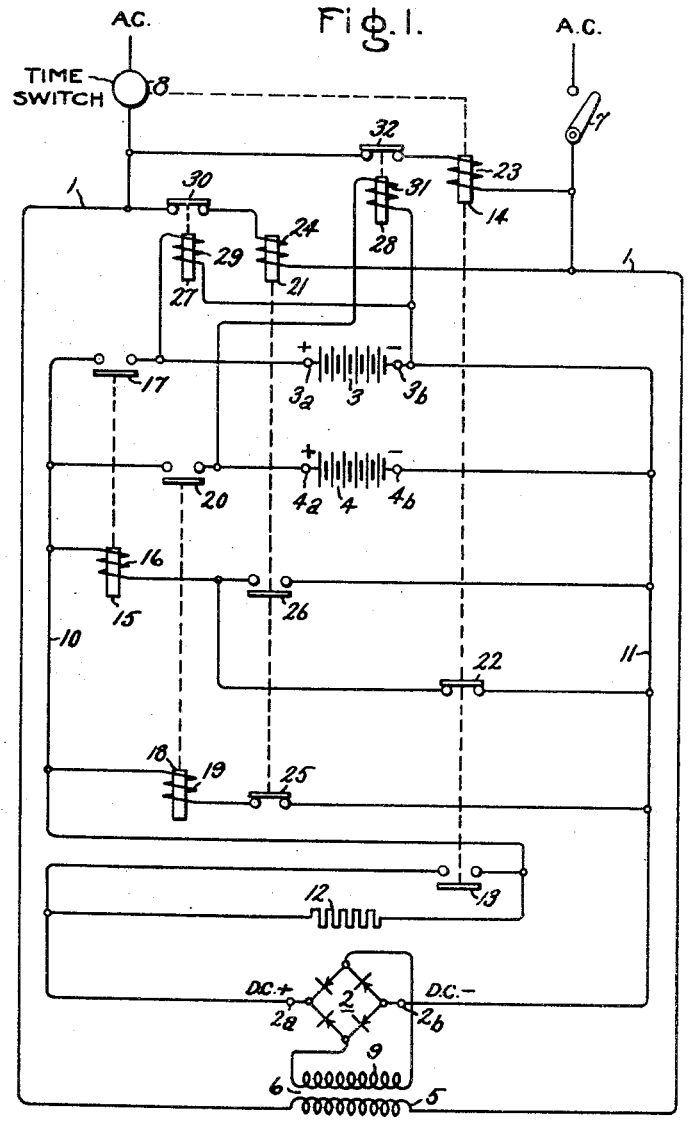
Figure 2:
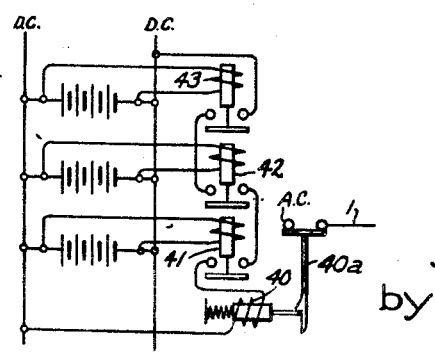

My invention itself will be more fully understood and its various objects and advantages further appreciated by referring now to the following detailed specification taken in conjunction with the accompanying drawing, in which Fig. 1 is a schematic circuit diagram of an electric storage battery charging apparatus embodying my invention, and Fig. 2 is a partial schematic circuit diagram illustrating a modification of one feature of my invention.

Referring now to the drawing, I have shown, by way of example, a battery charging system embodying my invention in a preferred form. The illustrated apparatus embodies in its operation my new and novel method. In the charging system illustrated, electric current is supplied from a single phase source of alternating current supply (not shown) through a pair of line conductors 1 and a rectifier 2, to charge a pair of electric storage batteries 3 and 4. The alternating current line conductors 1 are connected to a primary winding 5 of a transformer 6 and include, in series circuit relation with the winding 5, a manually operable control switch 7 and a normally closed automatic time switch 8. Secondary winding 9 of the transformer 6 is connected to the input terminals of the rectifier 2, which is preferably a full wave bridge connected metallic rectifier. It will, of course, be appreciated that my invention is not in any way limited to such a rectifier, but comprehends any suitable source of direct current supply. The rectifier 2 is provided with output terminals 2a and 2b, which constitute direct current supply terminals through which energy is supplied to charge the batteries 3 and 4. The batteries 3 and 4 are provided with terminals 3a, 3b and 4a and 4b, respectively. The output terminals 2a and 2b of the rectifier 2 are connected to a pair of direct current supply lines 10 and 11 through which current is supplied to charge the batteries 3 and 4. In the direct current supply line 10, there is included a current limiting resistor 12, which is arranged to be short circuited by a normally open auxiliary contact 13 of a control relay 14, as will be more fully described hereinafter. The control relay 14 is also connected when dropped out to initiate timing operation of the switch 8, as indicated schematically on the drawing.

The battery 3 is arranged to be connected to the direct current supply lines 10 and 11 by a contactor 15 having an actuating winding 16 and a normally open contact 17. The battery 4 is arranged to be connected to the supply lines 10 and 11 by a contactor 18 having an actuating winding 19 and a normally open contact 20. The contactors 15 and 18 are controlled by the control relay 14 and the control relay 21. The control relay 14 includes, in addition to the normally open contact 13, a normally closed contact 22 and an actuating winding 23. The relay contact 22 is connected in series circuit relation with the actuating winding 16 of the contactor 15 between the direct current supply conductors 10 and 11. The control relay 21 is provided with an actuating winding 24, and includes a normally closed contact 25 and a normally open contact 26. The relay contact 25 is connected in series circuit relation with the actuating winding 19 of the contactor 18 between the direct current supply conductors 10 and 11, and the relay contact 26 is connected in shunt circuit relation with the contact 22 of the relay 14.

The control relays 21 and 14 are controlled, respectively, by a pair of voltage responsive relays 27 and 28. The voltage relay 27 is provided with an actuating winding 29 connected across the terminals of the battery 3, and includes a normally closed contact 30 connected in series circuit relation with the actuating winding 24 of the control relay 21 between the alternating current supply conductors 1. The voltage relay 28 is provided with an actuating winding 31 connected across the terminals of the battery 4, and includes a normally closed contact 32 connected in series circuit relation with the actuating winding 23 of the control relay 14 between the alternating current supply conductors 1. Each voltage relay 27 and 28 is adjusted to pick up upon a voltage of predetermined value corresponding to a condition of charge less than complete charge of the associated battery, for example at a voltage indicative of 80% to 90% of full charge.

With the foregoing understanding of the function and the manner of connection of the various component parts of the battery charging system illustrated in the drawing, the mode of operation of the system and the nature of my new and novel charging method embodied therein will be fully understood from the following brief description.

Assuming that the batteries 3 and 4 are both connected for charging between their respective pairs of terminals 3a, 3b and 4a, 4b, the automatic time switch 8 is first set to open at a desired time interval after it is set in operation. Such interval is determined by experience, and should be sufficient to permit bringing the batteries simultaneously from their predetermined partially charged condition to a state of full charge at a predetermined low charging rate. Charging may then be initiated by closing the manual control switch 7.

If it be assumed that both the batteries 3 and 4 are in such a state of discharge that the charge voltage of each is less than the predetermined value at which the voltage relays 27 and 28 pick up, both these relays will remain dropped out and their contacts 30 and 32, respectively, closed. Upon closure of the control switch 7, therefore, the voltage relay contact 32 completes an energizing circuit between the alternating current supply lines 1 for the actuating winding 23 of the control relay 14, and the voltage relay contact 30 completes a similar energizing circuit for the actuating winding 24 of the control relay 21. Both the control relays 14 and 21 are therefore picked up. When the control relay 14 picks up, it closes its contact 13 to provide a shunt circuit around the current limiting resistor 12, and opens its contact 22. Opening of the contact 22 has no immediate effect. When the control relay 21 picks up, it opens its contact 25 to preclude energization of contactor actuating winding 19, and closes its contact 26. Closure of the control relay contact 26 connects the actuating winding 16 of the contactor 15 for energization across the direct current supply conductors 10 and 11. Accordingly, the contactor 15 picks up and closes its contact 17 to connect the battery 3 across the direct current supply conductors 10 and 11. Initially then, charging current is supplied to the battery 3 at a high rate, and the battery 4 is disconnected from the direct current supply source.

When the battery 3 has been charged to such a point that its terminal voltage is sufficient to pick up the voltage relay 27, the relay 27 opens its contact 30, thereby to open the circuit of the control relay actuating winding 24. With the winding 24 deenergized, the control relay 21 drops out, opening its contact 26 and closing its contact 25. Opening of the contact 26 interrupts the energizing circuit for the contactor actuating winding 16, and closure of the contact 25 completes an energizing circuit for the actuating winding 19 of the contactor 18. Thus, dropout of the control relay 21 causes dropout of the contactor 15 and pickup of the contactor 18, thereby disconnecting the battery 3 from and connecting the battery 4 to the direct current supply lines 10 and 11. After the transfer of battery connection effected by the control relay 21, the battery 4 is charged at a high rate while the battery 3, being partially charged, is temporarily disconnected from the charging circuit.

When the battery 4 is charged to a point where its terminal voltage is sufficient to pick up the voltage relay 28, the relay 28 opens its contact 32, thereby to interrupt the energizing circuit for the control relay actuating winding 23. When the winding 23 is deenergized, the control relay 14 drops out, closing its contact 22 and opening its contact 13. Closure of the control relay contact 22 reestablishes an energizing circuit for the actuating winding 16 of the contactor 15, so that the contactor 15 picks up and reconnects the battery 3 to the direct current supply lines 10 and 11. Dropout of relay 14 also initiates timing of the time switch 8, so that the switch 8 will open after a predetermined interval. The battery 4 remains connected to the direct current supply lines by reason of the fact that the actuating winding 19 of the contactor 18 remains energized through the contact 25 of the control relay 21. Simultaneously with the reconnection of the battery 3 to the charging circuit, the contact 13 of the control relay 14 interrupts the shunt circuit around the current limiting resistor 12. Thus, when both batteries have been partially charged to such a point that their charge voltages are both at a predetermined value, the batteries are connected in parallel circuit relation to the charging circuit, and the charging rate is simultaneously reduced by insertion of the current limiting resistor 12 in the circuit between the batteries and the current supply source. Thereafter, charging of the batteries in parallel circuit relation thus proceeds at a reduced rate, until finally the time switch 8 interrupts the alternating current supply circuit 1.

As previously pointed out, the automatic time switch 8 is set for an interval such that charging will be discontinued only when all the batteries have attained an approximately completely-charged condition. This same purpose could, of course, be accomplished by a group of voltage relays, each responsive to a voltage corresponding to a completely-charged condition at one of the batteries, the relays being arranged jointly to control a disconnecting switch. Such an arrangement is shown in principle at Fig. 2, where a trip coil 40 of a disconnecting switch 40a is connected to be energized through the series-connected normally open contacts of a plurality of relays 41, 42 and 43, each of which has an actuating coil connected for response to the charge voltage of one of the batteries being charged.

While I have illustrated my invention, by way of example, as applied to the charging of a single pair of batteries, it will, of course, be understood by those skilled in the art that any desired number of batteries may be similarly charged, partially sequentially and partially simultaneously. Moreover, it will be further understood by those skilled in the art that the single battery connected between each pair of battery terminals in the illustrated embodiment of my invention is shown by way of example only. Finally, it will be appreciated from the foregoing description, that the current limiting resistor 12 need not necessarily be connected in the direct current supply line, but may equally well be inserted in current limiting relation in any part of the supply or charging circuit between the battery terminals and the source of alternating current supply.

Thus, while I have described only a preferred embodiment of my invention by way of illustration, many modifications will occur to those skilled in the art, and I wish to have it understood that I intend in the appended claims to cover all such modifications as fall within the true spirit and scope of my invention.

What I claim as new and desire to secure by Letters Patent of the United States is:

1. In a charging apparatus for a plurality of electric storage batteries, means for sequentially connecting said batteries to a source of electric current supply, said means including voltage responsive means for transferring connections of said batteries as each said battery attains a predetermined voltage corresponding to a condition of charge less than full charge, and means responsive to presence of at least said predetermined voltage at all said batteries for simultaneously connecting all said batteries to said supply source.

2. In a charging apparatus for a plurality of electric storage batteries, means for sequentially connecting said batteries to a source of direct current supply for charging at a predetermined rate, said means including means responsive to the voltage of each of said batteries for transferring said connections when each said battery attains the predetermined voltage corresponding to a condition of charge less than full charge, and means responsive to presence of at least said predetermined voltage at all said batteries for simultaneously connecting all said batteries to said supply source and reducing the rate of charge.

3. In a charging apparatus for a plurality of electric storage batteries, means for sequentially connecting said batteries to a source of electric current supply for charging at a predetermined rate, said means including means responsive to the voltage of each of said batteries for transferring said connections when each said battery attains a predetermined voltage corresponding to a condition of charge less than full charge, means responsive to the presence of at least said predetermined voltage at all said batteries for simultaneously connecting all said batteries to said supply source and reducing the rate of charge, and means for disconnecting said supply source when approximately full charge is attained at each of said batteries.

4. In a charging apparatus for a plurality of electric storage batteries, switching means for connecting each of said batteries separately to a source of direct current supply, voltage responsive means associated with each said battery and responsive to a predetermined voltage corresponding to a condition of charge less than full charge for actuating said switching means to transfer connection of said supply source to another battery whose voltage is less than said predetermined voltage, and means operable upon actuation of all said voltage responsive means to connect all said batteries simultaneously to said supply source for further charge.

5. In a charging apparatus for a plurality of electric storage batteries, switching means for connecting each of said batteries separately to a source of direct current supply for charging at a predetermined rate, voltage responsive means associated with each of said batteries and responsive to a predetermined voltage corresponding to a condition of charge less than full charge for actuating said switching means to transfer connection of said supply source to another battery whose voltage is less than said predetermined voltage, and means operable upon actuation of all said voltage responsive means for reducing the charging rate and actuating said switching means to connect all said batteries simultaneously to said supply source for further charge at said reduced rate.

6. In a charging apparatus for a plurality of electric storage batteries, means for sequentially connecting said batteries to a source of electric current supply for charging at a predetermined rate, said means including means responsive to the voltage of each of said batteries for transferring connection from one battery to another when each said battery attains a predetermined voltage corresponding to a condition of charge less than full charge, and means responsive to presence of at least said predetermined voltage at all said batteries for connecting said batteries simultaneously to said supply source and inserting a current limiting resistor between said batteries and said source to reduce the charging rate.

7. In a charging apparatus for a plurality of electric storage batteries, switching means for connecting each of said batteries separately to a source of electric current supply for charging at a predetermined rate, voltage responsive means associated with each said battery and responsive to a predetermined voltage corresponding to a condition of charge less than full charge for actuating said switching means to transfer connection of said supply source to another battery whose voltage is less than said predetermined voltage thereby partially to charge said batteries in sequence, and means operable upon actuation of all said voltage responsive means for actuating said switching means to connect said batteries to said supply source in parallel circuit relation and simultaneously connecting a current limiting resistor between said batteries and said supply source to reduce the charging rate.

8. In a charging apparatus for a pair of electric storage batteries, separate switching means for connecting each of said batteries to a source of electric current supply, separate means responsive to the voltage of each of said batteries and actuable upon a predetermined voltage corresponding to a condition of charge less than full charge, means controlled by one said voltage-responsive means for alternatively actuating said switching means to connect the associated battery to said supply source when its voltage is below said predetermined value and to connect the other battery to said supply source when the voltage of said one battery attains said predetermined value, and means controlled by the other said voltage responsive means when the voltage of said other battery attains said predetermined value for actuating one said switching means to connect said one battery to said supply source independently of said one voltage-responsive means.

9. In a charging apparatus for a pair of electric storage batteries, separate switching means for connecting each of said batteries to a source of electric current supply, first voltage-responsive means connected for response to the voltage of one of said batteries and arranged alternatively to actuate said switching means, said first voltage responsive means actuating one said switching means to connect said one battery to said supply source when the voltage of said battery is below a predetermined voltage corresponding to a condition of charge less than full charge and actuating the other said switching means to connect the other said battery to said supply source when the voltage of said one battery has attained said predetermined value, and second voltage-responsive means connected for response to the voltage of said other battery for actuating said one switching means to connect said one battery to said supply source independently of said first voltage-responsive means, whereby when both said batteries have attained said predetermined voltage said batteries are connected to said supply source in parallel circuit relation for further charge.

10. In a charging apparatus for a pair of electric storage batteries, separate switching means for connecting each said battery to a source of electric current supply, means responsive to the voltage of one of said batteries for actuating said switching means to connect said one battery to said supply source when the voltage of said one battery is below a predetermined voltage corresponding to a condition of charge less than full charge and actuating said switching means to connect the other said battery to said supply source when the voltage of said one battery is at least equal to said predetermined voltage, and means responsive to the voltage of said other battery for connecting a current limiting resistor between said batteries and said supply source and simultaneously actuating said switching means to reconnect said one battery to said supply source, whereby upon attainment of said predetermined voltage by both said batteries said batteries are further charged simultaneously at a reduced rate.

JOSEPH J. BUCKLEY.

REFERENCES CITED

The following references are of record in the file of this patent:

UNITED STATES PATENTS

| Number | Name | Date |
| --- | --- | --- |
| 972,782 | Entz | Oct. 11, 1910 |
| 1,344,812 | Ogden | June 29, 1920 |
| 1,400,268 | Cully | Dec. 13, 1921 |
| 1,582,708 | Vaughn | Apr. 27, 1926 |
| 1,726,639 | Addicks | Sept. 3, 1929 |
| 2,096,440 | Wetzer | Oct. 19, 1937 |
| 2,227,118 | Amsden | Dec. 31, 1940 |
| 2,272,745 | Hinds et al. | Feb. 10, 1942 |
| 2,421,828 | Bruney | June 10, 1947 |